(12) United States Patent
Wu

(10) Patent No.: US 8,902,827 B2
(45) Date of Patent: Dec. 2, 2014

(54) RELAY FOR HANDLING DATA FORWARDING IN A WIRELESS COMMUNICATION SYSTEM AND RELATED METHOD FOR CONTROLLING THE SAME

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 867 days.

(21) Appl. No.: 12/761,412

(22) Filed: Apr. 16, 2010

(65) Prior Publication Data

US 2010/0265872 A1   Oct. 21, 2010

Related U.S. Application Data

(60) Provisional application No. 61/171,096, filed on Apr. 21, 2009.

(51) Int. Cl.
- *H04W 4/00* (2009.01)
- *H04W 16/26* (2009.01)
- *H04B 7/155* (2006.01)
- *H04W 84/04* (2009.01)

(52) U.S. Cl.
CPC ........... *H04W 16/26* (2013.01); *H04B 7/15557* (2013.01); *H04W 84/047* (2013.01)
USPC ....................................................... 370/329

(58) Field of Classification Search
CPC . H04W 16/26; H04W 84/047; H04B 7/15557
See application file for complete search history.

(56) References Cited

U.S. PATENT DOCUMENTS

| | | | |
|---|---|---|---|
| 2009/0135778 A1* | 5/2009 | Lee et al. | 370/329 |
| 2010/0103863 A1* | 4/2010 | Uulpinar et al. | 370/315 |
| 2010/0202343 A1* | 8/2010 | Hunzinger et al. | 370/315 |
| 2010/0260129 A1* | 10/2010 | Ulupinar et al. | 370/329 |
| 2010/0265873 A1* | 10/2010 | Yi et al. | 370/315 |

FOREIGN PATENT DOCUMENTS

EP   1 798 998 A1   6/2007

OTHER PUBLICATIONS

U.S. Appl. No. 61/108,287, Uupinat, Faith, cell relay base station for lte, pp. 1-111.*
U.S. Appl. No. 61/168,522, Uupinat, Faith, relay node processing for LTE, pp. 1-52.*
U.S. Appl. No. 61/111,668, Hunzinger, Jason, a method for base station relaying in multihop heterogeneous UMTS. pp. 1-36.*
U.S. Appl. No. 61/111,677, Hunzinger, Jason, a method for super light router relaying in multihop heterogeneous UMTS. pp. 1-10.*
Ericsson: "Relay", 3GPP TSG-RAN WG3#63-bis, Tdoc R3-090835, Mar. 23-26, 2009, XP050341212, Seoul, KR.

(Continued)

*Primary Examiner* — Steven H Nguyen
(74) *Attorney, Agent, or Firm* — Winston Hsu; Scott Margo

(57) ABSTRACT

A relay of a wireless communication system for handling data forwarding between at least a user equipment (UE) and a base station (BS) is disclosed. The relay includes a UE interfacing unit and a BS interfacing AS unit. The UE interfacing unit is used for communicating with the base station and includes an AS (Access Stratum) unit for performing AS functionalities with the base station based on a first AS protocol. The relay is recognized as a UE by the base station via the first AS protocol. The BS interfacing AS unit wirelessly performs BS AS functionalities with the UEs based on a second AS protocol and exchanging data with the UE interfacing unit.

17 Claims, 8 Drawing Sheets

(56) References Cited

OTHER PUBLICATIONS

Panasonic: "Study Issues for Relay Nodes in RAN2", Agenda Item:7, 3GPP TSG-RAN WG2 Meeting #65_bis, R2-092393, Mar. 23-27, 2009, XP050340114, Seoul, Rep. of Korea.

LG Electronics Inc.: "CoMP scheduling considering different types of relay nodes", Agenda Item: 15.2, TSG-RAN WG1 Meeting #56bis, R1-091190, Mar. 23-27, 2009, XP050338807, Seoul, Korea.

Texas Instruments: "On the design of relay node for LTE-advanced", 3GPP TSG RAN WG1#56, R1-090593, Feb. 9-13, 2009, XP050318480, Athens, Greece.

CMCC: "Considerations on Relay related Procedures", 3GPP TSG-RAN WG2 Meeting #65bis, R2-092410, Mar. 23-Mar. 27, 2009, XP050340128, Seoul, Korea.

CMCC: "Discussions on Functionality Partition of Relay in RAN2", 3GPP TSG-RAN WG2 Meeting #65bis, R2-092407, Mar. 23-Mar. 27, 2009, XP050340127, Seoul, Korea.

3GPP TR 36.814 V0.4.1 Technical Specification Group Radio Access Network; Further Advancements for E-UTRA Physical Layer Aspects (Release 9), Feb. 2009.

3GPP TSG-RAN WG2 #65bis R2-092153, "Preference for Relay Operation in LTE-A", Mar. 2009.

\* cited by examiner


RELAY FOR HANDLING DATA FORWARDING IN A WIRELESS COMMUNICATION SYSTEM AND RELATED METHOD FOR CONTROLLING THE SAME

CROSS REFERENCE TO RELATED APPLICATIONS

This application claims the benefit of U.S. Provisional Application No. 61/171,096, filed on Apr. 21, 2009 and entitled "scheme to establish connection between relay and eNB in wireless communications system" the contents of which are incorporated herein in their entirety.

BACKGROUND OF THE INVENTION

1. Field of the Invention

A device utilized in a wireless communication and method thereof is provided and more particularly, related to a relay of a wireless communication system for handling data forwarding and related method for controlling the same.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), serving gateway, etc for NAS (Non Access Stratum) control.

A long term evolution-advanced (LTE-A) system, as its name implies, is an evolution of the LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover.

To achieve the abovementioned goals, how to structure a relay and how a relay communicates with the eNB and the UEs are topics for discussion.

SUMMARY OF THE INVENTION

A relay of a wireless communication system for handling data forwarding and related method for controlling the same is provided so that the relay can efficiently, effectively communicates with the network and the mobile devices.

A relay of a wireless communication system for handling data forwarding between at least a user equipment (UE) and a base station (BS) is disclosed. The relay includes a UE interfacing unit, including an access stratum (AS) unit, and a BS interfacing AS unit. The UE interfacing unit is used for communicating with the base station. The AS unit is used for performing AS functionalities with the base station based on a first AS protocol. The relay is recognized as a UE by the base station via the first AS protocol. The BS interfacing AS unit is used for wirelessly performing BS AS functionalities with the UEs based on a second AS protocol and exchanging data with the UE interfacing unit.

A method of handling data forwarding between at least a UE and a base station for a relay of a wireless communication system is disclosed. The method includes performing radio resource control (RRC) functionality with the base station, whereby the relay can be recognized as a UE by the base station via the RRC functionality, and wirelessly communicating with the UEs according to the performed RRC functionality.

A relay of a wireless communication system for handling data forwarding between at least a UE and a base station is disclosed. The relay includes means for performing RRC functionality with the base station, whereby the relay can be recognized as a UE by the base station, and means for wirelessly communicating with the UEs according to the performed RRC functionality.

These and other objectives will no doubt become obvious to those of ordinary skill in the art after reading the following detailed description of the preferred example that is illustrated in the various figures and drawings.

DETAILED DESCRIPTION

Figure 1:
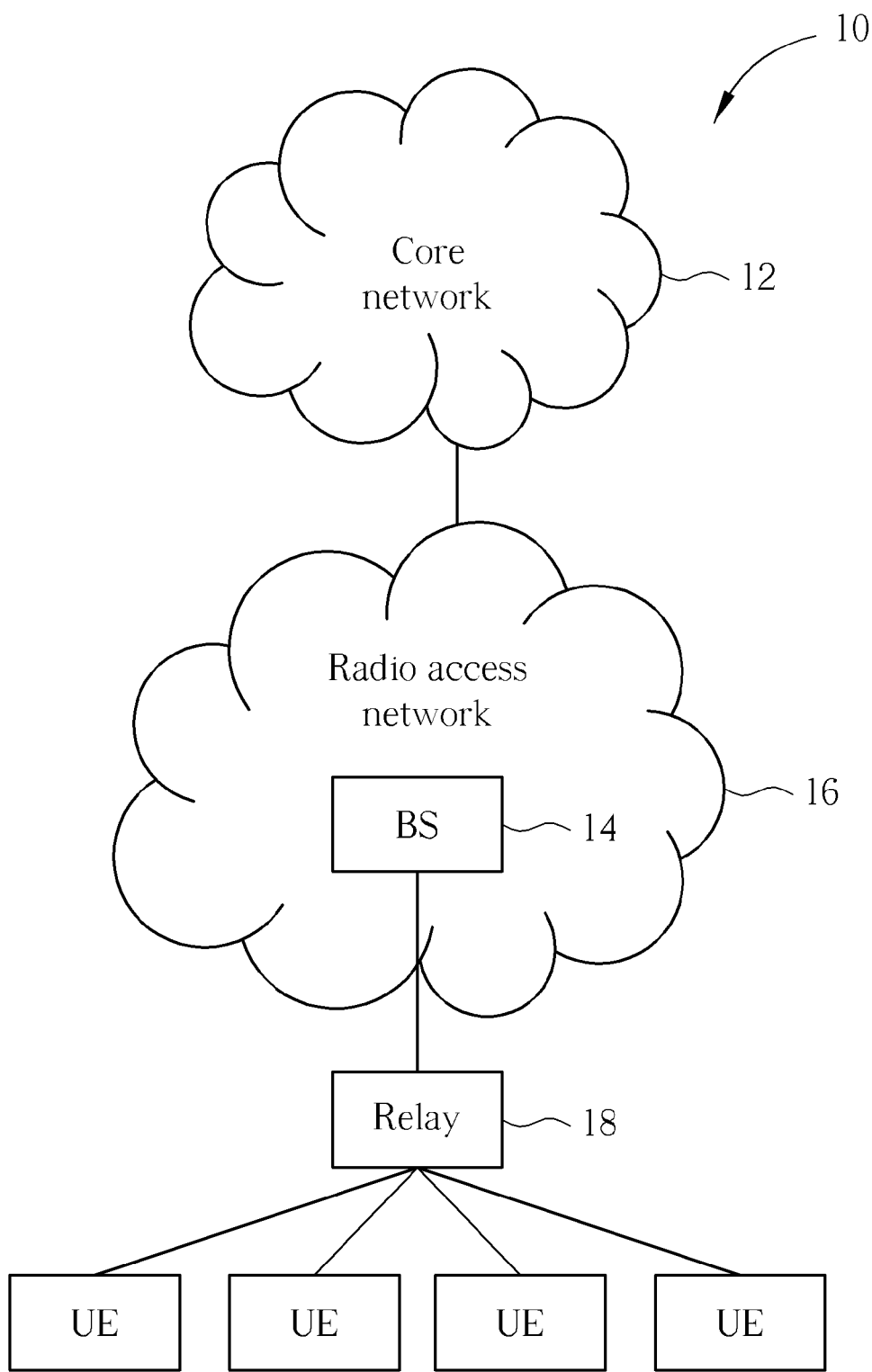
FIG. 1 is a schematic diagram of an exemplary wireless communication system.

FIG. 1 illustrates a schematic diagram of a wireless communication system 10 according to an example. The wireless communication system 10 includes a core network 12, a base station (BS) 14 of a radio access network 16, a relay 18 and a plurality of user equipments (UEs) wirelessly coupled to the relay 18. The radio access network 16 performs AS (Access Stratum) control for the UEs, whereas the core network 12 performs NAS (Non Access Stratum) control for the UEs through the radio access network 16. The wireless communication system 10 may be a UMTS (Universal Mobile Telecommunications System), an LTE (long-term evolution) system, an LTE-A (LTE-Advance) or any other similar network system. In the LTE system, the radio access network 16 and the base station 14 are referred as a EUTRAN (evolved-UMTS Terrestrial Radio Access Network) and eNB (evolved Node-B) respectively. The UEs can be devices such as mobile phones, computer systems, etc. Accordingly, the core network 12 may include a mobility management entity (MME) and a serving gateway. This terminology will be used throughout the application for ease of reference, and however, this should not be construed as limiting the scope of the disclosure to any one particular type of network. The radio access network 16 and the UEs can be seen as a transmitter or receiver according to transmission direction, e.g., for uplink (UL), the UEs are the transmitter and the radio access network 16 is the receiver, and for downlink (DL), the radio access network 16 is the transmitter and the UEs are the receiver. The relay 18 is wirelessly connected to the radio access network 16 and responsible for handling and conveying data from the base station 14 assigned as a donor base station to the UEs or data from the UEs to the base station 14, thereby maintaining a throughput between the UE and the base station 14 above a certain required level. The relay 18 may establish data radio bearers to forward data between the UEs and base station 14.

The BS-to-relay and BS-to-UE connections can be an inband or outband connection. The inband connection means that the BS-to-relay connection shares the same band with direct BS-to-UE connections. The outband connection means that the BS-to-relay connection does not operate in the same band as the direct BS-to-UE connections. In addition, the relay 18 may be a transparent relay with which the UE is not aware of whether or not it communicates with the radio access network 16 via the relay 18. Or the relay 18 may be a non-transparent relay with which the UE is aware of whether or not it is communicating with the radio access network 16 via the relay 18. The wireless communication system 10 is a simplified example to explain the concept of the disclosure, and the relay 18 may simultaneously communicate with multiple base stations via multiple connections. In addition, the relay 18 may be part of the donor cell controlled by the base station 14 assigned as the donor base station or control cells of its own.

Figure 2:
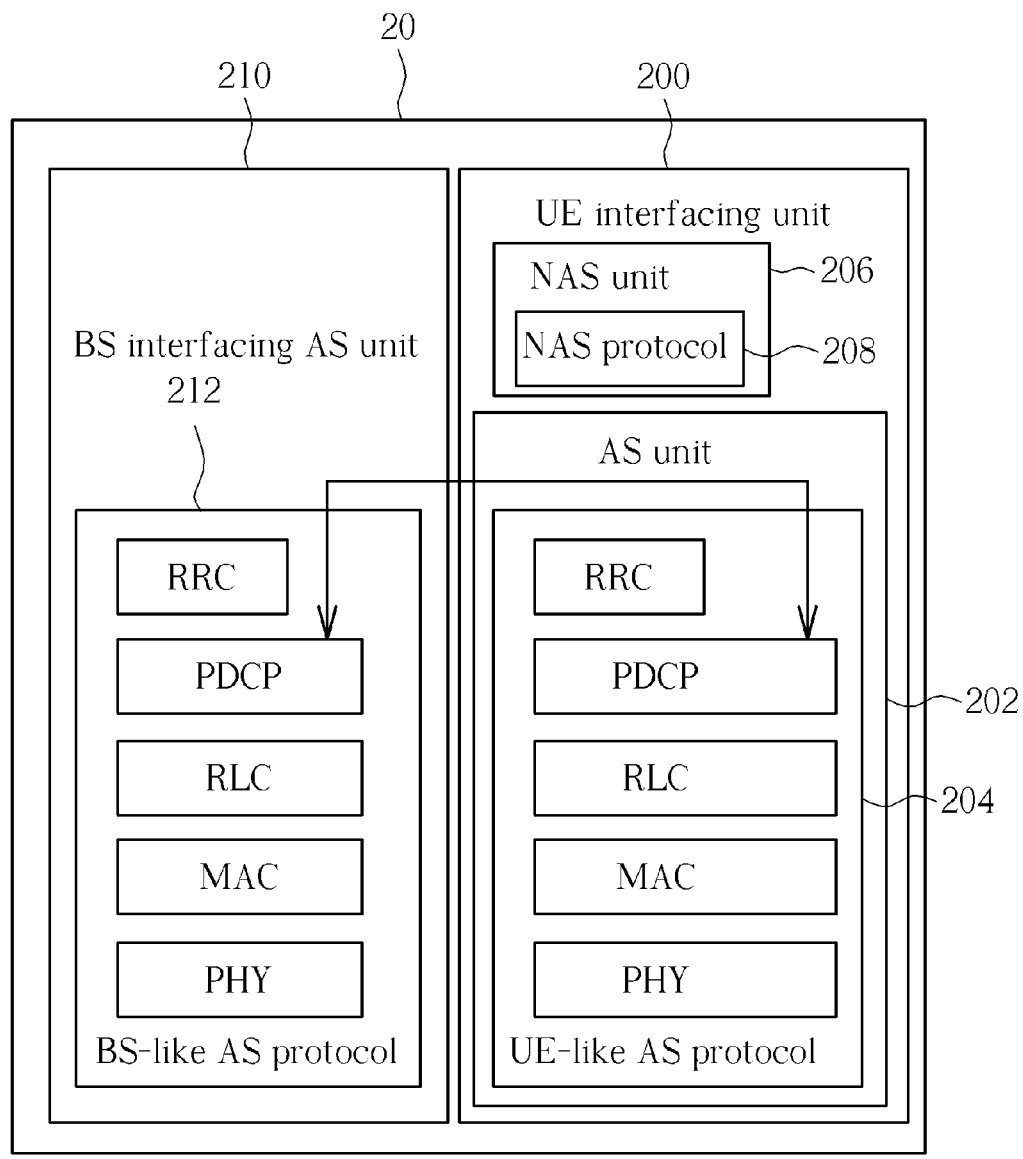
FIG. 2 is a schematic diagram of an exemplary relay.

FIG. 2 illustrates a schematic diagram of an exemplary relay 20. The relay 20 may be the relay 18 and includes a UE interfacing unit 200 for communicating with a base station (e.g. the base station 14) and a BS interfacing (base station-like) AS unit 210. The UE interfacing unit 200 includes an access stratum (AS) unit 202 and a non access stratum (NAS) unit 206. The AS unit 202 performs AS functionalities with the base station based on a UE-like AS protocol 204. The NAS unit 206 exchanges NAS data to perform NAS functionalities with a core network (e.g. the core network 12) based on a NAS protocol 208. The BS interfacing AS unit 210 wirelessly performs BS AS functionalities with the UEs based on a BS-like AS protocol 212 and exchanges data with the UE interfacing unit 200. For LTE/LTE-A application, the UE-like AS protocol 204 and the BS interfacing AS unit 210 each may include a radio resource control (RRC) layer, a packet data convergence protocol (PDCP) layer, a radio link control (RLC) layer, a medium access control (MAC) layer and a physical (PHY) layer. The AS, BS AS, and NAS functionalities may include authentication, control plane signaling, transfer of user plane data, security of the control plane signaling and the user plane data, and connection control functionalities inherited from AS functionalities of the UEs and the base station and NAS functionalities of the UEs and the core network. The procedure and parameters of the inherited functionalities may refer to LTE/LTE-A specifiaction of 3GPP (Third Generation Partnership Project), and detailed operation thereof is omitted herein. For example, the relay 18 performs a RRC connection establishment procedure to establish a RRC connection and performs a NAS Attach procedure to register to the MME. In addition, the NAS and AS functions of the relay 18 may be a simplified version of the NAS and AS functions of the UEs. For example, the relay 18 may not inherit a RRC measurement functionality of the UEs. As can be seen from the above, the base station also performs the BS AS functionalities with the AS unit 202 based on the BS-like AS protocol 212. Thus, the relay 18 is recognized as a UE by the base station via the UE-like AS protocol 204, and the relay 18 may appear as a base station or a relay itself to the UEs via the BS-like AS protocol 212.

The relays 20 may further include a Universal Subscriber Identity Module (USIM), not shown in FIG. 2, coupled to the UE interfacing unit. The USIM include a secret key for the relay to perform ciphering, integrity protection, authentication key agreement (AKA), etc. The base station communicating with the relay 20 may be a donor base station of the UEs. The relay 20 may select an appreciate base station or be configuration to connect to a base station for registration. The core network may be informed about the registration of the relay 20.

Figure 3:
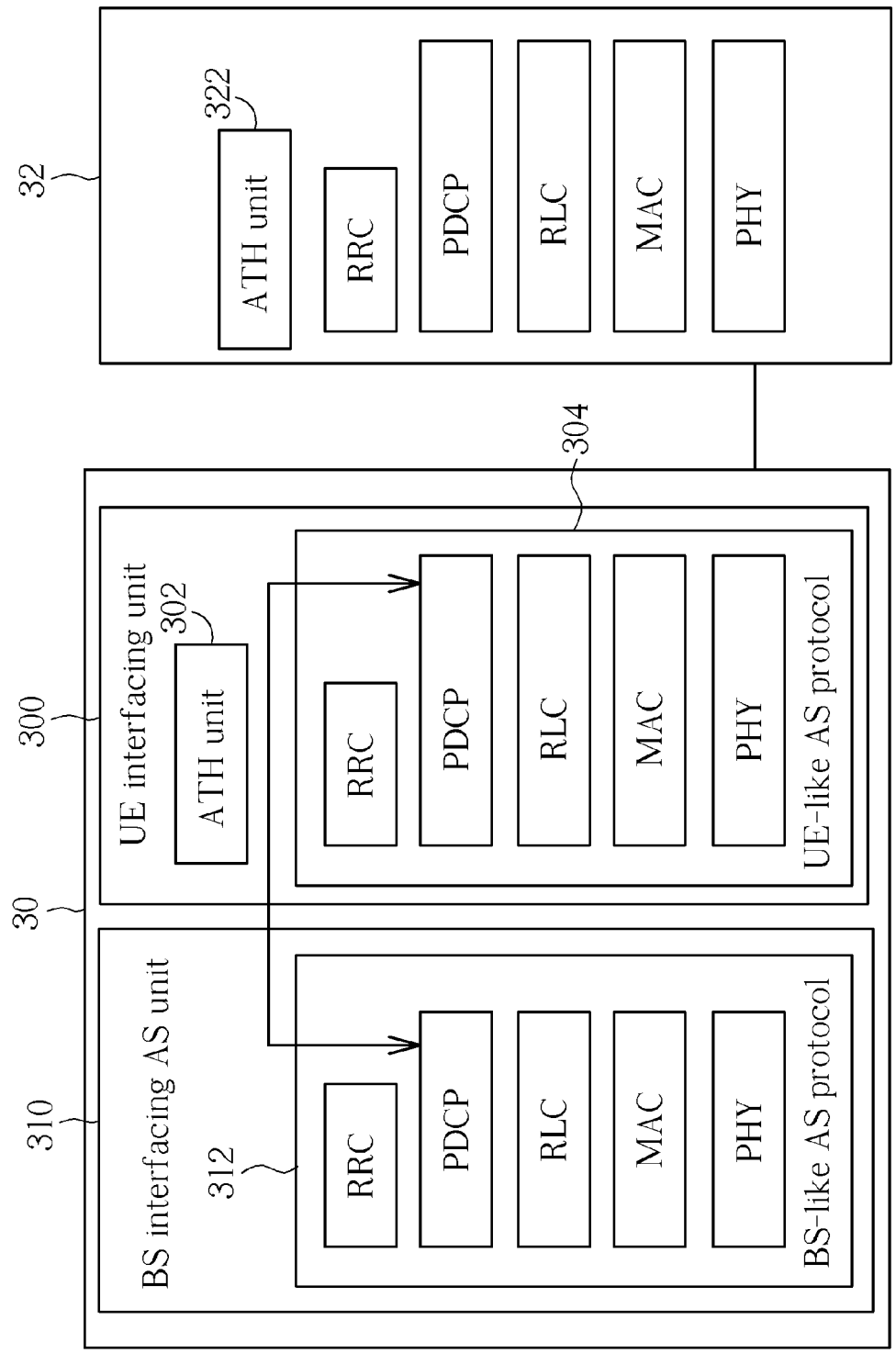
FIG. 3 is a schematic diagram of an exemplary relay.

FIG. 3 illustrates a schematic diagram of an exemplary relay 30. The relay 30 may be the relay 18 of FIG. 1 and includes a UE interfacing AS unit 300 including an authentication (ATH) unit 302 and a BS interfacing AS unit 310. The UE interfacing AS unit 300 performs AS functionalities with a base station 32 (e.g. the base station 14) based on a UE-like AS protocol 304. The base station 32 may be a donor base station of the relay 30 and includes an ATH unit 322 and the same AS protocol structure as the BS-like AS unit 312. The ATH unit 302 performs authentication functionality with the ATH unit 322 of the base station 32. Via the authentication functionality, the relay 30 can be authenticated by the base station 32 without need of non access stratum communication. After the base station authenticates the relay 18 successfully, the base station may configure data radio bearers for the relay 18 to forward data from the UEs to the base station or data from the base station to the UEs. The BS interfacing AS unit 310 for wirelessly performing BS AS functionalities with the UEs based on a BS-like AS protocol 312 and exchanges data with the UE interfacing AS unit 300. The UE-like AS protocol 304, the BS interfacing AS unit 310, and the BS interfacing AS protocol 312 works similarly to the UE-like AS protocol 204, the BS interfacing AS unit 210, and the BS-like AS protocol 212 respectively and related detailed operation are omitted herein. With the ATH unit 302, the NAS configuration associated with the relay 30 itself can be eliminated. Thus, the core network does not need to perform any NAS control for the relay 30 itself but may be still involved with the NAS control of the UEs.

Figure 4:
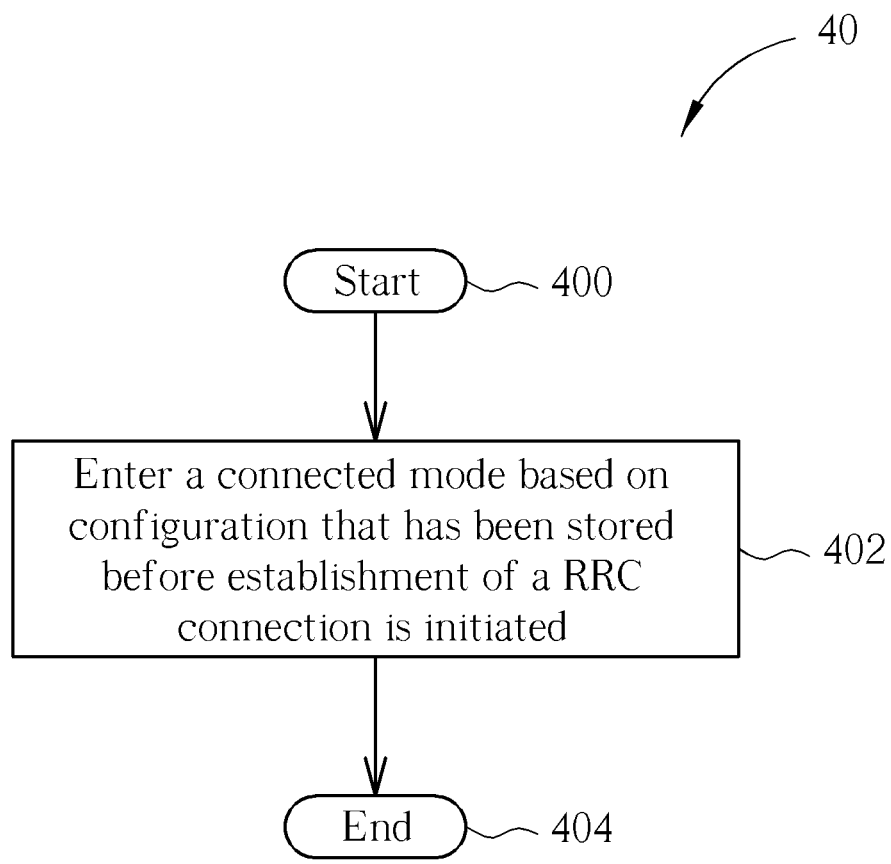
FIGS. 4-6 are flowcharts of exemplary processes.

FIG. 4 illustrates a schematic diagram of an exemplary process 40. The process 40 is used in a relay for handling data forwarding with a base station in a wireless communication system and includes the following steps:

Step 400: Start.

Step 402: Enter a connected mode based on configuration that has been stored before establishment of a RRC connection is initiated.

Step 404: End.

According to the process 40, the relay may automatically enter a connected mode based on the configuration that has been stored before establishment of a RRC connection is initiated and may have been known by both the relay and the base station before the relay enters the connected mode. The relay in the connected mode represents that the relay has a RRC connection with the base station and the RRC connection is established based on the configuration. Since the configuration has been known by the based station, the based station is able to know exactly how to deal with the connection the relay would like to establish and thereby do corresponding connection configuration at itself. In other words, the relay is pre-configured to establish the connection without any signaling exchange between the base station and the relay, and the base station is capable of recognizing the pre-configured relay. The connection and connection mode thereof may be the RRC connection and the RRC_CONNECTED mode. The relay may perform Step 402 when powering on. The configuration includes at least one of a radio network temporary identifier, an integrity key, a ciphering key, a base-station-level key, and dedicated preamble configuration related to random access. For example, a preconfigured dedicated preamble and a preconfigured C-RNTI (Cell Radio Network Temporary Identifier) are set for performing a random access procedure for obtaining the first time access to the base station and uplink synchronization. The base station can recognize the relay based on the preconfigured C-RNTI that may allow the relay and the UEs to be distinguishable from each other. Preconfigured security configuration is set for activating security function during the connection establishment and may include integrity and ciphering keys or a pre-configured base-station-level key (e.g. a $K_{eNB}$). Through the process 40, the base station and the relay are able to save radio resources for connection establishment.

Figure 5:
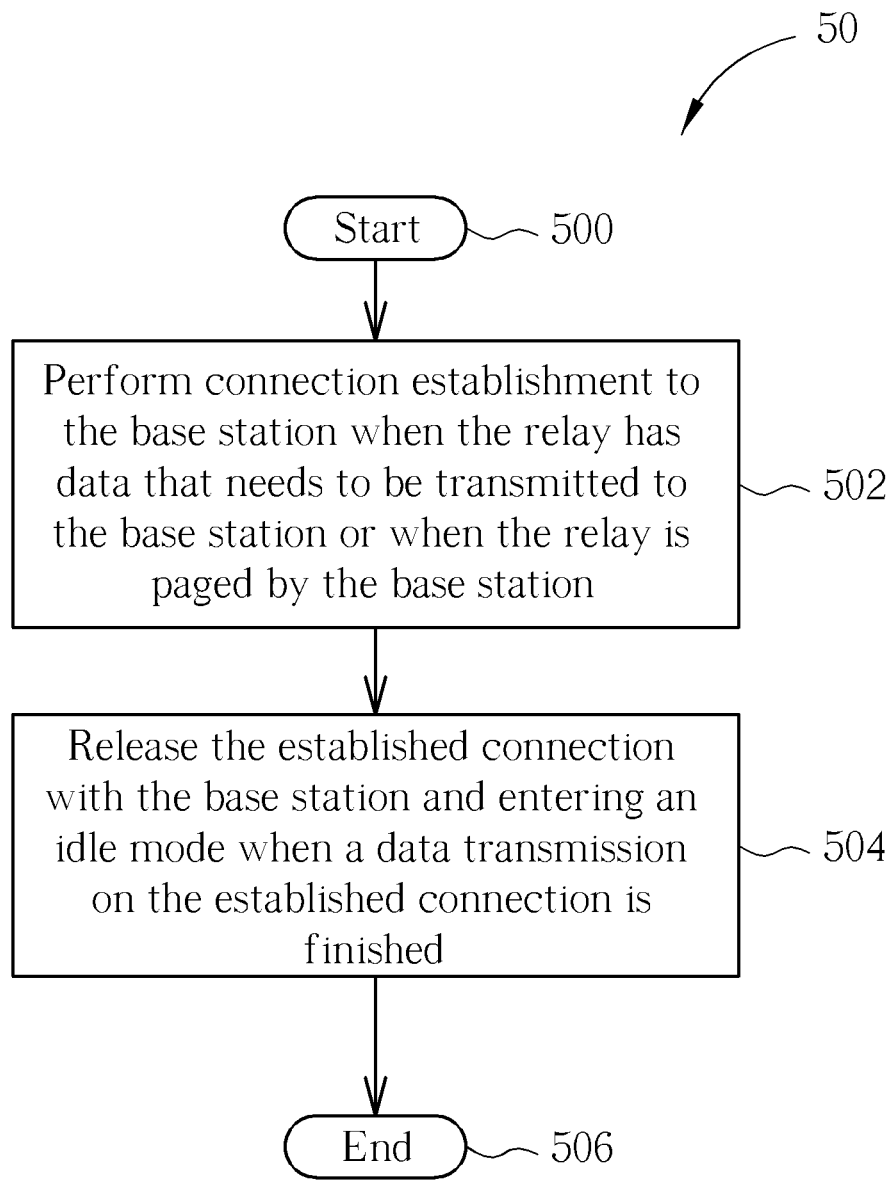

FIG. 5 illustrates a schematic diagram of an exemplary process 50. The process 50 is used in a relay for handling data forwarding with a base station in a wireless communication system and includes the following steps:

Step 500: Start.

Step 502: Perform connection establishment to the base station when the relay has data that needs to be transmitted to the base station or when the relay is paged by the base station.

Step 504: Release the established connection with the base station and entering an idle mode when a data transmission on the established connection is finished.

Step 506: End.

According to the process 50, the relay performs the connection establishment, e.g. RRC connection establishment, to the base station when the relay has the data that needs to be transmitted to the base station or is paged by the base station. Furthermore, the relay releases the established connection and enters an idle mode when a data transmission of the connection establishment is finished. The idle mode, e.g. a RRC_IDLE mode, herein means that the relay does not have any RRC connection for unicast data transfer with the base station. The situation that the relay has the data that needs to be transmitted to the base station may represent that the relay has received data from the UE, whereas the situation that the relay is paged by the base station may represent that the base station has data for the relay to forward to the UEs. Therefore, through the process 50, the relay stays in the idle mode until a data transmission attempt triggered is made, in order to save power.

The RRC connection establishment may be performed via a random access procedure for obtaining uplink synchronization and a RRC connection establishment procedure, inherited from the procedure between the UEs and the base station/core network.

Figure 6:
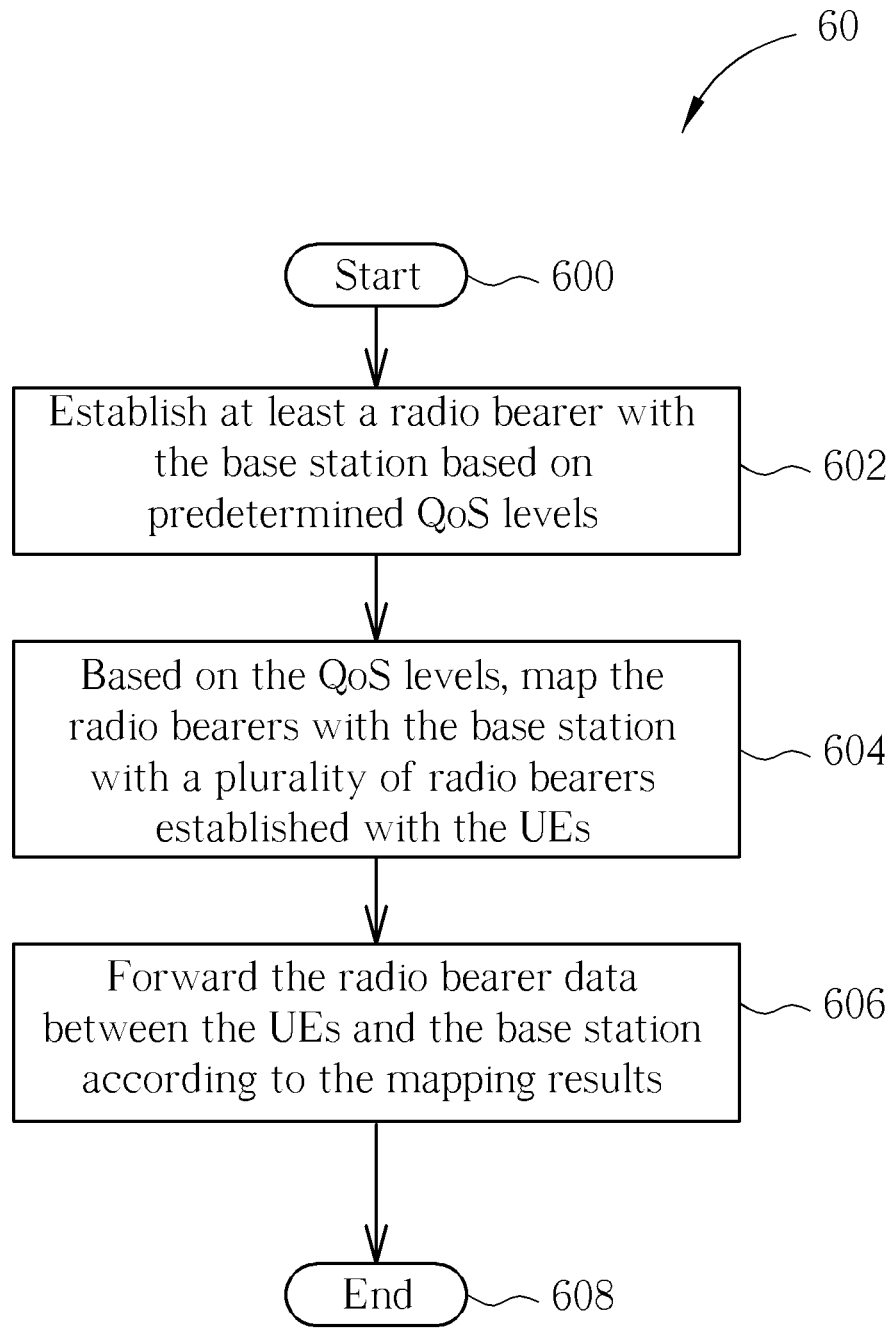

FIG. 6 illustrates a schematic diagram of an exemplary process 60. The process 60 is used in a relay for handling data forwarding between at least a UE and a base station in a wireless communication system and includes the following steps:

Step 600: Start.

Step 602: Establish at least a radio bearer with the base station based on quality of service (QoS) levels.

Step 604: Based on the QoS levels, map the radio bearers with the base station with a plurality of radio bearers established with the UEs.

Step 606: Forward the radio bearer data between the UEs and the base station according to the mapping results.

Step 608: End.

According to the process 60, the relay maps the radio bearers established with the UEs and the base station and forwards the radio bearer data between the UEs and the base station according to the mapping results. In other words, the relay can classify data from the UEs based on the QoS levels that may have been set when the relay powers on.

Figure 7:
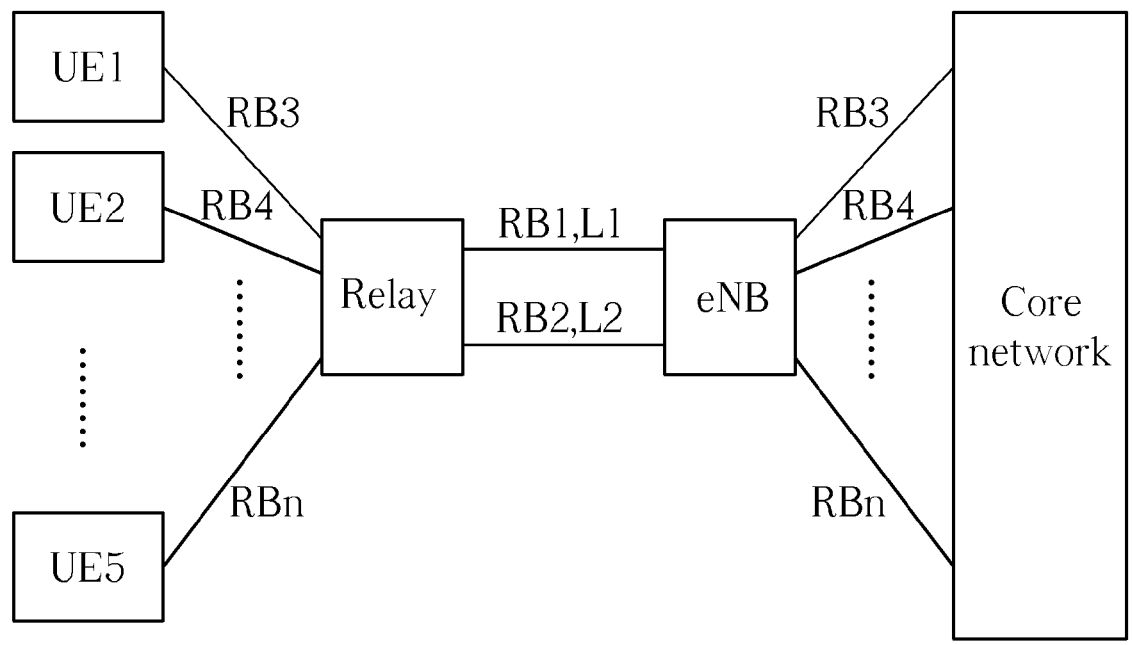
FIGS. 7-8 are schematic diagrams of exemplary radio bearer mapping according to FIG. 6.
Figure 8:
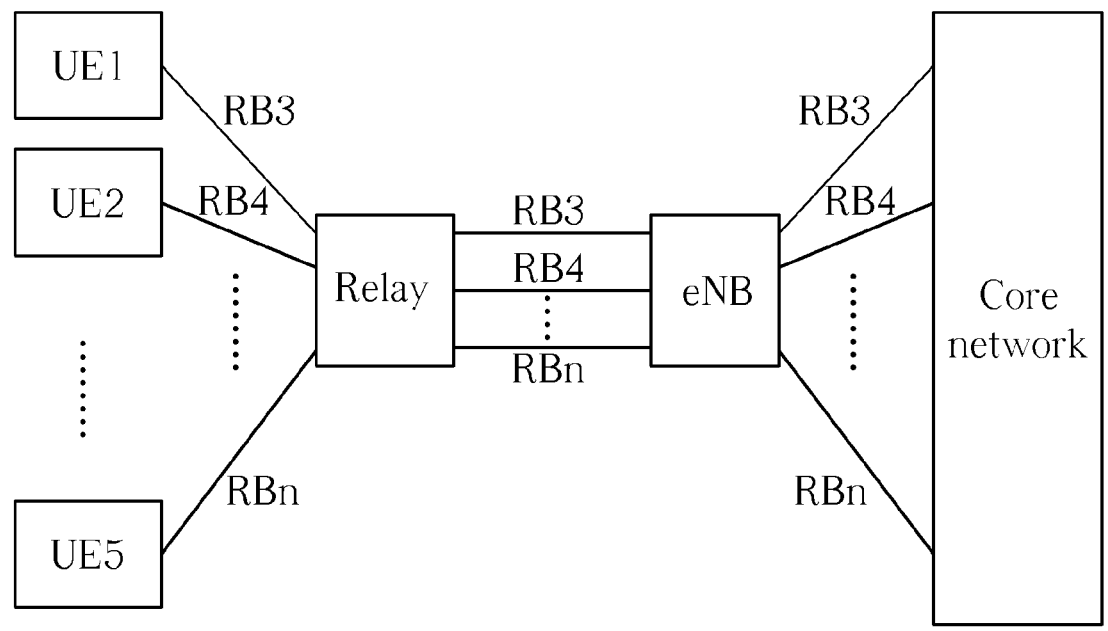

For example, FIGS. 7-8 illustrate schematic diagrams of exemplary radio bearer mapping according to the concept of the process 60. In FIG. 7, a relay establishes a radio bearer RB1 with a QoS level L1 and a radio bearer RB2 with a QoS level L2 with an eNB. In addition, the relay performs data communication with UE1-UE5 by establishing radio bearers RB3-RBn. When the relay receives data from one of UE1-UE5, the relay forwards the data via RB1 or RB2 based on the QoS levels L1 and L2. The data conforming to the QoS level L1 is transmitted to the eNB via the radio bearer RB1. Similarly, the data conforming to the QoS level L2 is transmitted to the eNB via the radio bearer RB2. As for the radio bear mapping, the relay can determine whether the data of the UE1-UE5 conform to the QoS level L1 or L2, based on RB3-RBn configurations. The eNB restores the radio bearers RB3-RBn established between the UE and the relay so that core network is allowed to perform NAS control for the UEs as if direct connections are used between the UEs and eNB.

FIG. 8 depicts that the eNB and the relay sets up radio bearers totally according to the QoS levels of the radio bearers established between the UEs and the eNB. In other words, the relay does not re-arrange radio bearer data of the UEs into new radio bearers for forwarding data to the eNB.

The concepts of the processes 40-60 are applicable for the relays 18, 20 and 30, and other relays that can perform AS/RRC control for forwarding data between the UEs and the base station. For example, the UE interfacing unit 200 of the relay 20 may be use for performing Step 602. The UE interfacing unit 200 itself, the BS interfacing AS unit 210 itself, or both the UE interfacing unit 200 and the BS interfacing AS unit 210 may be used as a mapping unit for performing Step 604 and also may be used as a forwarding unit for performing Step 606. The same usage can be applied for the relay 30.

Please note that the steps of the abovementioned processes, including suggested steps, can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and a communication device that includes a memory unit for storing program code corresponding to any of the abovementioned processes and a processor means for accessing the program code.

In conclusion, the examples as mentioned above provide means and methods of efficiently, effectively communicating with UEs and the eNB in the aspects of AS, NAS, authentication, and security.

Those skilled in the art will readily observe that numerous modifications and alterations of the device and method may be made while retaining the teachings and spirit and scope of the disclosure. Accordingly, the above disclosure should be construed as limited only by the metes and bounds of the appended claims.

What is claimed is:

1. A relay of a wireless communication system for handling data forwarding between at least a user equipment (UE) and a base station, the relay comprising:

a UE interfacing unit for communicating with the base station and establishing at least a radio bearer with the base station based on quality of service (QoS) levels, the UE interfacing unit comprising:

an access stratum (AS) unit for performing AS functionalities with the base station based on a first AS protocol;

a base station (BS) interfacing AS unit for wirelessly performing BS AS functionalities with the UEs based on a second AS protocol and exchanging data with the UE interfacing unit;

a mapping unit for mapping the at least a radio bearer with a plurality of radio bearers established between the relay and the UEs based on the QoS levels, wherein the number of the radio bearers established between the relay and the UEs is larger than the number of the at least a radio bearer; and a forwarding unit for forwarding the radio bearer data from the UEs to the base station according to the mapping results.

2. The relay of claim 1, wherein the UE interfacing unit further comprises a non access stratum (NAS) unit for exchanging NAS data associated with NAS functionalities with a core network via the base station, wherein the NAS data includes at least one of data associated with mobility of the UE and data associated with user plane bearers of the UE.

3. The relay of claim 2, wherein the AS, NAS, and BS AS functionalities comprise at least one of authentication, control plane signaling, transfer of user plane data, security of the control plane signaling and the user plane data, and connection control functionalities.

4. The relay of claim 2 further comprising a Universal Subscriber Identity Module (USIM) coupled to the UE interfacing unit.

5. The relay of claim 1, wherein the AS unit of the UE interfacing unit comprises an authentication (ATH) unit for performing an authentication functionality, wherein the relay is authenticated by the base station via the authentication functionality without non access stratum communication.

6. The relay of claim 5, wherein the relay has a relay identity that can be distinguished by the base station, and the AS unit of the UE interfacing unit makes use of the relay identity in a radio resource control procedure or in the authentication functionality.

7. The relay of claim 6, wherein the relay further has a secret key set, and the AS unit of the UE interfacing unit derives an authentication key from the secret key set and makes use of the authentication key in the authentication functionality.

8. The relay of claim 7, wherein the AS unit of the UE interfacing unit derives RRC integrity keys and RRC ciphering keys from the authentication key and makes use of the RRC integrity keys and the RRC ciphering keys for integrity protection and ciphering of radio bearers.

9. The relay of claim 1, wherein the AS unit of the UE interfacing unit enters a radio resource control (RRC) connected mode based on configuration that has been stored before establishment of a RRC connection is initiated.

10. The relay of claim 9, wherein the configuration includes at least one of a radio network temporary identifier, an integrity key, a ciphering key, a base-station-level key, and dedicated preamble configuration related to random access.

11. The relay of claim 1, wherein the AS unit of the UE interfacing unit performs RRC connection establishment to the base station when the relay has data that needs to be transmitted to the base station or when the relay is paged by the base station, and enters an RRC idle mode when a data transmission on the established RRC connection is finished.

12. A method of handling data forwarding between at least a user equipment (UE) and a base station for a relay of a wireless communication system, the method comprising:
performing radio resource control (RRC) functionality with the base station; and
wirelessly communicating with the UEs according to the performed RRC functionality;
establishing at least a radio bearer with the base station based on quality of service (QoS) levels;
based on the QoS levels, mapping the at least a radio bearer with a plurality of radio bearers that are established with the UEs, wherein the number of the radio bearers established between the relay and the UEs is larger than the number of the at least a radio bearer; and
forwarding the radio bearer data from the UEs to the base station according to the mapping results.

13. The method of claim 12, wherein performing the RRC functionality with the base station comprises:
entering a connected mode based on configuration that has been stored before establishment of a RRC connection is initiated, wherein the relay in the connected mode has a connection with the base station and the RRC connection is established based on the configuration, wherein the configuration includes at least one of a radio network temporary identifier, an integrity key, a ciphering key, a base-station-level key, and dedicated preamble configuration related to random access.

14. The method of claim 12, wherein performing the RRC functionality with the base station comprising:
performing connection establishment to the base station when the relay has data that needs to be transmitted to the base station or when the relay is paged by the base station; and
releasing the established connection with the base station and entering an idle mode when a data transmission on the established connection is finished.

15. A relay of a wireless communication system for handling data forwarding between at least a user equipment (UE) and a base station, the relay comprising:
means for performing radio resource control (RRC) functionality with the base station;
means for wirelessly communicating with the UEs according to the performed RRC functionality;
means for establishing at least a radio bearer with the base station based on quality of service (QoS) levels;
means for based on the QoS levels, mapping the at least a radio bearer with a plurality of radio bearers that are established with the UEs, wherein the number of the radio bearers established between the relay and the UEs is larger than the number of the at least a radio bearer; and
means for forwarding the radio bearer data from the UEs to the base station according to the mapping results.

16. The relay of claim 15, wherein the means for performing the RRC functionality with the base station comprises:
means for storing configuration before establishment of a RRC connection is initiated; and
means for entering a connected mode based on the configuration, wherein the relay in the connected mode has a connection with the base station and the RRC connection is established based on the configuration, wherein the configuration includes at least one of a radio network temporary identifier, an integrity key, a ciphering key, a base-station-level key, and dedicated preamble configuration related to random access.

17. The relay of claim 15, wherein the means for performing the RRC functionality with the base station comprises:
means for performing connection establishment to the base station when the relay has data that needs to be transmitted to the base station or when the relay is paged by the base station; and
means for releasing the established connection with the base station and entering an idle mode when a data transmission on the established connection is finished.

* * * * *